United States Patent [19]

Tickner et al.

[11] Patent Number: 5,278,194
[45] Date of Patent: Jan. 11, 1994

[54] ENVIRONMENTALL DISPERSIBLE SYNTACTIC FOAM

[75] Inventors: E. Glenn Tickner, Coulterville; Robert E. Short, Los Gatos, both of Calif.

[73] Assignee: Microsome, Sunnyvale, Calif.

[21] Appl. No.: 36,915

[22] Filed: Mar. 25, 1993

[51] Int. Cl.$^5$ .............................................. C08J 9/32
[52] U.S. Cl. ..................... 521/55; 106/122; 521/54; 521/84.1; 521/109.1; 521/60; 521/146; 521/916; 523/219
[58] Field of Search .................. 106/122; 521/54, 55, 521/84.1, 146, 916; 523/219

[56] References Cited

U.S. PATENT DOCUMENTS

| | | |
|---|---|---|
| 3,155,590 | 11/1964 | Miller et al. |
| 3,205,175 | 9/1965 | Malerson |
| 3,325,341 | 6/1967 | Shannon |
| 3,415,758 | 12/1968 | Powell et al. |
| 3,891,570 | 6/1975 | Fukushima et al. |
| 4,077,922 | 3/1978 | Farrissey, Jr. et al. |
| 4,118,336 | 10/1978 | Morishita et al. |
| 4,876,055 | 10/1989 | Cattanach |
| 4,888,420 | 12/1989 | Steiner et al. |
| 4,997,559 | 3/1991 | Steiner et al. |
| 5,106,880 | 4/1992 | Miller et al. |
| 5,110,838 | 5/1992 | Tokiwa et al. |
| 5,116,550 | 5/1992 | Perkins |
| 5,116,880 | 5/1992 | Tokiwa et al. |
| 5,120,769 | 6/1992 | Dyksterhouse et al. |

OTHER PUBLICATIONS

Biodegradable Plastics-An Idea whose Time Has Come Evans & Sikdar; pp. 38-42; Chem. Tech.-Jan. 1990.
The Prospects for Biodegradable Plastics F. Rodriquez pp. 409-415; Chem Tech-Jul. 1971.
Hollow Drop Production By Injection of Gas Bubbles ... Calliger, et al.; pp. 846-851; Am Instit of Phy. vol. 48, Jul. 1971.
An Investigation of the Effects of System Parameters on the Production . . . J. L. Guttman, et al. pp. 4139-4142; 1979 AM Instit of Phy.; J. Appl. Phys. (50)6, Jun. 1991.
Most Biodegradable Plastics Are A "Con" Andy Coghlan, p. 27 Scientist Feb. 8, 1992.
Biodegraability of Modified Films In Controlled Biological Environments; Krupp & Jewell pp. 193-198; 1991 Am. Chem. Soc.; Environ. Sci. Technol; vol. 26, No. 1, 1992.
Syntactic; 1983 Plastics Desk Manual.

*Primary Examiner*—Morton Foelak
*Attorney, Agent, or Firm*—Fliesler, Dubb, Meyer & Lovejoy

[57] ABSTRACT

A syntactic foam product having a desired configuration is set forth. The product comprises a plurality of rigid gas filled bubbles arranged in the desired configuration. The bubbles are defined by respective individual and discrete substantially spherical shells preferably formed of a biodegradable shell material. The shells abut one another. They define open spaces where they are not abutting. Attaching material attaches the abutting shells to one another. The open spaces between the shells are not filled by the attaching material. The attaching material is environmentally degradable. It releases the bubbles under ambient conditions after a selected time interval. The shells are in contact with their surroundings and can relatively rapidly biodegrade.

4 Claims, 2 Drawing Sheets

ENVIRONMENTALL DISPERSIBLE SYNTACTIC FOAM

TECHNICAL FIELD

The invention relates to a readily environmentally dispersible syntactic foam material which exhibits comparable physical characteristics to a closed-cell plastic foam but is not a true foam. The material can be made so as to have low thermal conductivity. The material can be created to be biodegradable and can be produced from renewable resources, such as cellulose, starch, eggs, and wheat flour. Shaped articles, for example, hot food containers or edible cones, made utilizing the syntactic foam material can be used in the same manner as are currently available shaped articles made with conventional foam.

BACKGROUND OF THE INVENTION

Foam products are employed for a wide variety of commercial applications. Low-cost disposable foams are used for thermal insulation such as insulated cups, trays and clam-shell food holders. Longer lived products such as insulation for thermoses, refrigerators, and freezers and insulated water pipe covers are common products. Rigid foams are now utilized for combined sound and thermal insulation on various residential and commercial dwellings for quick installation. Two part liquid foams are available to fill complex geometries and then solidify. Since some closed-cell foams are very light weight, generally being less than 10 lbs/cubic foot, they serve as long-term life preservers and floatation devices not requiring inflation of air. Some rigid foams exhibit high strength, specifically for cases when strength to weight ratio is critical. The light weight and flexibility characteristics of semi-rigid foams make them ideal for packing materials commonplace in the shipping industry.

One of the major advantages of plastic and plastic foams is its life expectancy. Plastics are durable and do not break down in the environment. Whereas metals are oxidized if not painted and loose their structural characteristics, plastics do not. Metals are reasonably heavy compared to plastics and, in many cases where strength to weight ratio is critical, metals are inferior to structural plastic foams. On the other hand, these long-life and durability properties of plastic have created environmental problems. The United States alone disposes of billions of pounds of plastic annually; plastic foam products constitute a large percentage of this volume. The actual life in the disposal environment is estimated to be in centuries.

Curtailment of this growing landfill problem could be achieved by recycling and/or producing biodegradable materials. However plastic recycling simply has not worked. One reason is the extreme difficulty in separating the various commercial plastics whose number seems to grow weekly. The other factor is the reluctance of the public to participate. Biodegradable plastics are still in the development stage, and to date only poly(hydroxybutyrate)/poly(hydroxyvalerate) [PHB/PHV] has been shown to degrade.

Many people have recognized the need for biodegradable products. Perhaps the first of these was the U.S. Department of Agriculture. In 1980, USDA started work on a starch additive for polymer films to initiate biodegradation. It was hypothesized that the additive would alter the structure to permit biodegradation. The starch additive actually improved some physical properties, but according to Krupp & Jewell, Krupp, L. R. & Jewell, W. J. "Biodegradability of Modified Plastic Films in Controlled Biologic Environments" Environ Sci Tech 26 (1992): 193–198, although the starch additive degraded the biodegradability of the plastic was unaltered.

Other approaches have been presented and patented. There are basically two approaches that have received the most attention. These are 1) photodegradable polymers and 2) production of naturally degradable biopolymers. Active research in these areas was initiated by governments, states, and private industry and individuals. Today commercial plastics incorporating one of these features are available. However, Krupp and Jewell found that only the additives were degraded. The polymer remained unchanged although in some cases it fragmented. Thus the authors concluded that only the organic additives were degraded by the digestive process leaving the polymer intact. There was one exception, the polymer poly(hydroxybutyrate)/poly(hydroxyvalerate). This polymer met all the requirements and was substantially biodegraded by the end of the experiment. Their conclusion was that the addition of organic additives make the plastic film dispersible, not biodegradable.

Recently Tokiwa and Iwamoto patented a biodisintegratable thermoplastic resin foam (Tokiwa Y., et al (May 5, 1992) "Biodegradable Thermoplastic Resin Foam and a Process for Producing Same" U.S. Pat. No. 5,110,838). These inventors produced a foam from a mixed resin consisting in part of a biodegradable resin using the melt kneading process, i.e., bubbles are produced in the bulk plastic with a foaming agent while under temperature and pressure. Upon reduction of pressure and temperature, the bubbles expand to form a foam of specific apparent density. This mixture can be extruded or molded to produce the preferred configuration. The foam would certainly be disintegratable; however, the total material is not biodegradable. Thus the environmental problem has not been solved by this invention, only ameliorated.

Perkins N. B. May 26, (1992) "Method of Making Biodegradable Free Fill Foam Packing Material" U.S. Pat. No. 5,116,550 teaches that biodegradable free fill polyurethane foam can be produced by blending liquid starch or sugars with the polyurethane. This approach is similar to other polyurethane foaming processes in that two components are brought together and chemically reacted thus forming a rigid foam. This product is essentially the same as a standard polyurethane foam except that it does contain biodegradable components. Therefore it is disintegratable.

Miller and Miller, "Plastic Foam Aggregate Matrix Made from Recycled Paper and Fiber Products" U.S. Pat. No. 5,106,880, Apr. 21, 1992) disclose an aggregate plastic foam prepared from a cellulose starch and recycled cellulose fiber material for the purpose of fabricating molded foam products for the shipping industry. The approach uses cellulose starch as a binder to entrap bubbles produced by a gas generating agent within the cellulose filler material. Small aggregates made from cellulose fibers, cellulose starch and bubbles are first formed, presumably to permit drying. The patent does not teach the methodology for producing such a foam. These aggregates are then brought together within a mold with similar materials to form a final foam structure which is both biodegradable and biodistintegratable. This patent is not concerned with syntactic foams.

Syntactic foams have been known for some time. Shannon, in U.S. Pat. No. 3,325,341 discloses a syntactic foam formulated of vitreous or argillaceous spheres bonded together by partial melting with the spaces between the spheres being void or preferably filled with a binder. The Shannon syntactic foam is not readily environmentally dispersible.

Dyksterhouse, et al., U.S. Pat. No. 5,120,769 discloses a syntactic foam which comprises microbubbles defined by glass, ceramic or plastic shells and which are formulated by a method which would appear to leave intersticial spaces between the bubbles other than where they contact one another. The microbubbles are bound to one another by appropriate binders. However, nothing is disclosed about choosing binders which are environmentally degradable so as to make the syntactic foam dispersible.

Cattanach, U.S. Pat. No. 4,876,055 discloses a syntactic foam which comprises microspheres having glass shells which are adhered to one another using a polymeric material (polyetheretherketone). Nothing is disclosed about choosing binders which are environmentally degradable so as to make the syntactic foam dispersible.

Alternative materials which would environmentally disperse and which would very preferably biodegrade in a relatively short period of time would be a significant advance in the state of the art. It would also be desirable if the material could be formed into desired structures without the use of environmentally destructive blowing agents. This invention provides, inter alia, just such materials.

DISCLOSURE OF INVENTION

The present invention is directed to overcoming one or more of the problems set forth above.

A syntactic foam product having a desired configuration is provided in accordance with an embodiment of the invention. The product comprises a plurality of solid gas filled bubbles arranged in the desired configuration. Each of the bubbles is defined by a respective individual and discrete substantially spherical shell. Each individual shell is in abutting relation with the shells of adjacent bubbles. Environmentally degradable attaching material attaches the abutting shells to one another where they abut without filling the intersticial space between the shells.

The invention thus provides a material which can replace current foams and which, in the preferred embodiment, can biodegrade in a selected, often relatively short, period of time. Preferably the shell are formed of a biodegradable material and the attaching material is environmentally degradable (soluble, biodegradable, photodegradable or chemically degradable). The biodegrading can occur relatively rapidly since once the bubbles are released from one another basically the entire surface of each of the bubbles becomes available for biodegradation. Indeed, since the spaces between the shells are not filled rapid degradation can occur even prior to release of the shells from one another. Not only the bubbles interiors are filled with gas but also the spaces between the shells are not filled, whereby the material is a particularly good thermal insulator. Furthermore, the material is formulated completely without the conventional foaming technique by which environmentally undesirable chemicals can be released into the atmosphere. Still further, suitable raw materials for use in forming the syntactic foam material, such as cellulose, starch and comparable materials, are bioreplacable.

DESCRIPTION OF DRAWINGS

The invention will be better understood by reference to the figures of the drawings wherein like numbers denote like parts throughout and wherein.

BEST MODE FOR CARRYING OUT INVENTION

Figure 1:
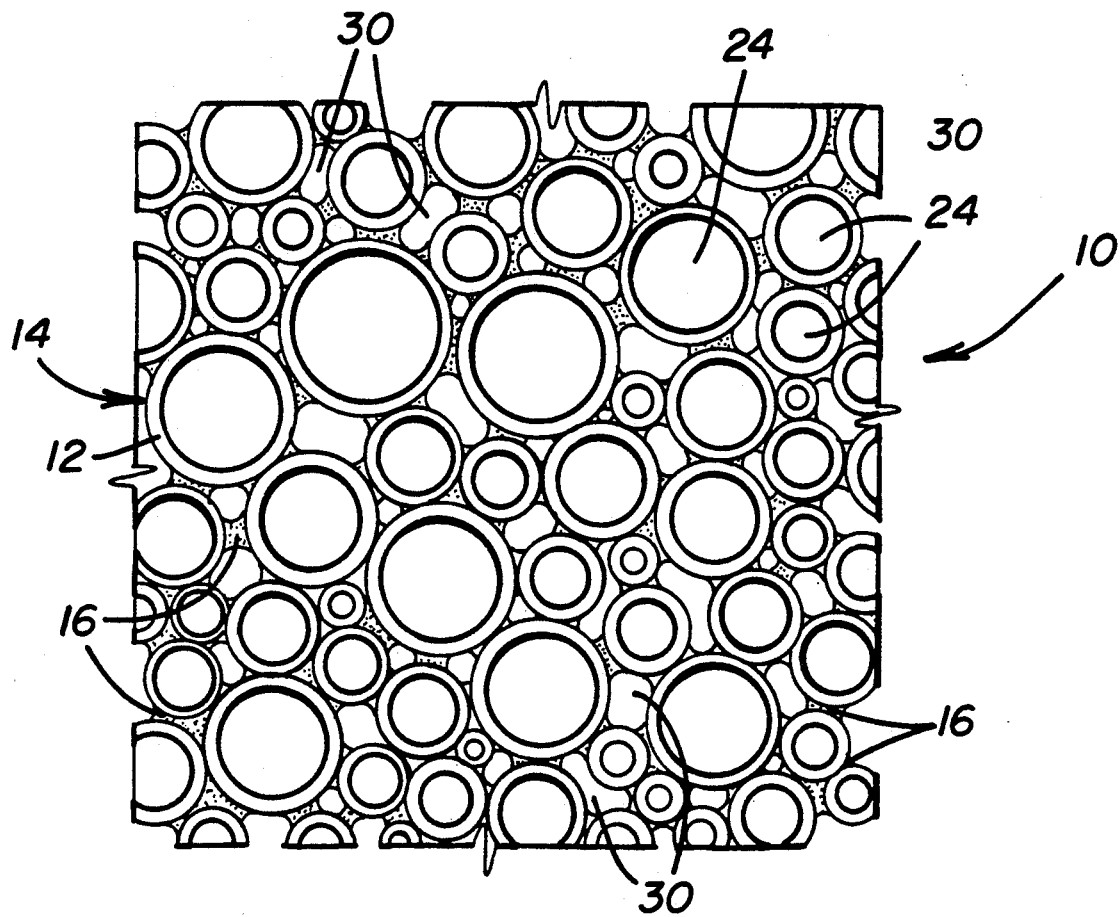
FIG. 1 illustrates, in section, syntactic foam material in accordance with an embodiment of the present invention.

In accordance with the present invention products are provided which can be made to be biodegradable and which offer alternatives to land-fill and to separation and recycling of plastics used in foams.

The syntactic foam is produced by first preparing small individual gas filled encapsulated bubbles and then bonding them to form a closed-cell, foam-like structure. The walls forming the bubbles are referred to herein as "shells". This new substance is physically different from open-cell foam (sponge).

Solid closed-cell foam is a mass of non-communicating gas bubbles entrapped within a solid matrix. The foam can be produced to be either rigid or flexible depending upon the application, but it is solid as contrasted with liquid like shaving foam. It maintains its physical characteristics over time. Solid foams are integral structures whereby they do not exhibit marked material differences at the solid webs of joining bubbles.

The syntactic foam material of the invention differs significantly in this regard from conventional closed-cell foams. Bubbles are prepared first and then bound together by adhesion to configure the syntactic foam structure. This leaves open spaces between the bubbles to provide excellent thermal insulation and to allow for relatively rapid dispersability and biodegradability.

The bonding agent itself, irrespective of the bubble material, is water soluble, reacts slowly with environmental chemicals, e.g., slowly oxidizes, slowly photodegrades, or is otherwise environmentally degradable. Thus, when the syntactic foam is exposed to the environment for a period of time and the bonding agent degrades, the product disintegrates, i.e., it is biodispersible. It also degrades at a rate dependant upon the bubble shell material. Thus disintegration (dispersion) is a separate technical occurrence and differs from degradation.

In accordance with an embodiment of the present invention pure cellulose and other degradable and non-degradable microbubbles are bonded together to produce foam products comparable in appearance and use to those produced from plastic discussed above, more specifically, comparable to foam products made from polystyrene like disposable cups, trays, clam-shell food holders, and packing filler materials. By proper choice of shell material and of attaching material, syntactic foam can be formulated so that, for example, disposable cups suitable for hot (or cold) drinks can be formulated and used for their design purpose, which cups will disintegrate and biodegrade over a period of time following use.

To better understand how the syntactic foam of the invention differs from the closed-cell foams of the prior art it would be useful to briefly summarize how the latter are made. There are three primary methods currently employed to produce closed-cell plastic foam. These are referred to as 1) blowing agent method, 2) chemical foaming method, and 3) fusion method. Each approach has many subsets too numerous to discuss here.

The blowing agent method is by far the most common in commercial use today. Foams are produced from a mixture of polymer, nucleating agent, and a blowing agent all thoroughly prepared and placed within a mold which is heated and maintained under pressure. Preliminary steps find a liquid blowing agent like pentane mixed into small pellets of the selected plastic. The blowing agent can instead be a solid like a carbonate which releases a gas when heated or reacted with water vapor. The pellets are placed within a mold of the final product configuration and the mold heated, often via live steam. Heat melts the plastic and converts the blowing agent from its original state into an expanding gas. The bubbles formed from the blowing agent attach themselves to the nucleating material in the melt and expand taking plastic with them. A cellular structure is formed as the bubbles expand within the mold. Upon cooling, the melt solidifies and a foam object is produced with the bubbles being part of and completely encapsulated within the plastic matrix. This concept lends itself to a very efficient production process.

The chemical foaming method is largely used for the production of polyurethane foams. The process involves bringing together two major chemical components generally in the presence of a blowing agent. A chemical reaction takes place producing microbubbles uniformly distributed within the newly created plastic. The blowing agent enhances the process. The expansion of bubbles carries plastic with them to form a foam structure. If an excess of blowing agent is incorporated in the base material, then the process is used to produce open-cell polyurethane foam. The chemistry can be controlled to govern the stiffness of the final product. During the foaming process, the new material can expand filling very irregular shapes which is an important feature of this process.

The original foaming technique was to form a foam froth by beating gas into a molten plastic and then to cool the molten foam to lock bubbles within the structure. This concept has been modified by using means other than fusion to set the plastic, including chemistry and external energy sources such as gamma radiation. It is not commonly used in industry.

The common denominator of current closed-cell, plastic foams is the integral internal structure surrounding the bubbles. The solid material of the web is uniform throughout where the solid plastic holds the bubbles in place. There are no shells to define the bubbles and no open spaces between such non-existent shells. As a result, even if the current foams are made of biodegradable materials they can only degrade relatively slowly since they are not environmentally dispersible whereby the biodegradation can only proceed inwardly from the outer surface of the foam and through the bulk material.

Figure 2:
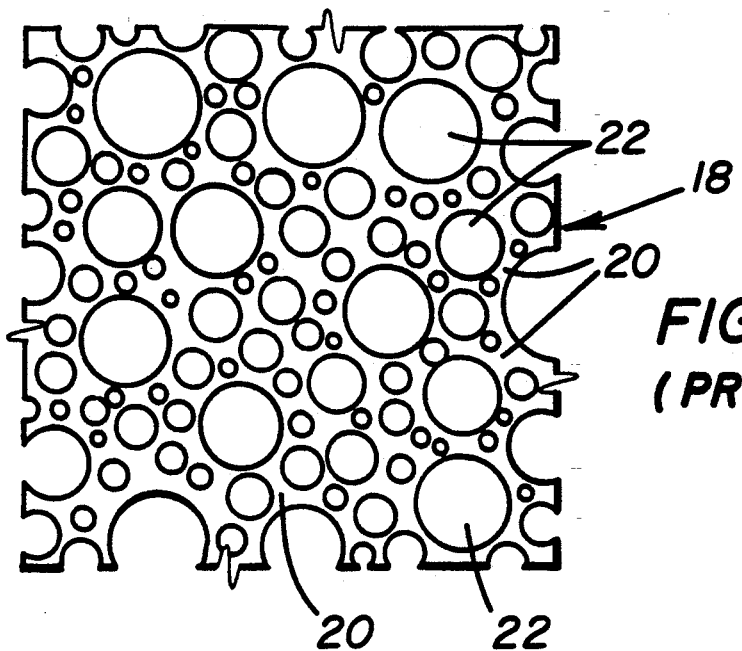
FIG. 2 illustrates, in section, typical closed-cell foam material of the prior art.
Figure 3:
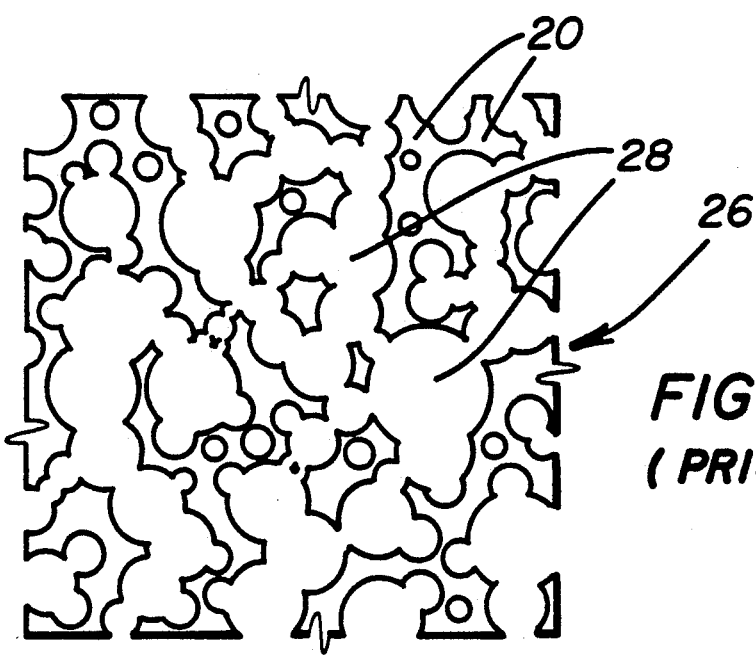
FIG. 3 illustrates, in section, typical open-cell foam material of the prior art.

The syntactic foam 10 of the present invention, shown in FIG. 1, is physically different than the prior art foams shown in FIGS. 2 and 3. The solid boundaries (shells) 12 of the bubbles 14 do not hold the foam together, but rather a bonding material serves this purpose at 16. Whereas closed-cell plastic foams 18 of the prior art, as shown in FIG. 2, consist of one solid plastic material 20 and gas filled bubbles 22, the syntactic foam 10 consists of more than one solid material (the shell material and the attaching material) and the gas 24 within the shells 12. For example, the solid phase can be the bubble shell wall material plus an adhesive. In the open-cell foam 26 of FIG. 3 connected openings 28 are present in the solid plastic matrix 20. The present syntactic foam 10 has open spaces or interstices (passages) 30, similar to the connected openings 28 of the open-cell foam 26, between the adhesive. The open spaces 30 expose the shells 12 of the bubbles 14 so as to allow biodegradation over a far larger surface area than only the outer surface. And, when the adhesive material environmentally degrades the individual bubbles are released whereby even more bubble surface is available to biodegrade.

In that gases are encapsulated within bubbles before the foam is produced, the gas can be selected for any desired properties. For most practical applications, the gas will likely remain air, nitrogen or carbon dioxide. For special applications of low conductance for example, one can select dichlorodifluoromethane as the encapsulated gas of choice.

Foams find a number of uses in our society. These are summarized in following:

Thermal Insulation Foams

Closed-cell foams act as efficient insulators owing to the presence of the small captured microbubbles within. Heat is transferred between two surfaces via radiation, solid and gaseous conduction, and convection. For typical ambient conditions, heat transfer via radiation is not a dominant mechanism, nor is free convection if cells are smaller than four to five millimeters in diameter. Heat transfer is limited to solid and gaseous conduction. Highly expanded foams are characterized by a relatively low amount of solid per unit volume which limits solid conduction as a heat transport mechanism. The dominant heat transfer mechanism is then gaseous conduction. Gas is a poor thermal conductor compared to solids and liquids. With limited exception, most gases exhibit comparable thermal conductivity; thus, most equally expanded foams exhibit comparable insulative features. The exceptions are the chlorofluorocarbon gases which possess lower thermal conductivities than other gases and therefore are commonly entrapped in foams used in special insulation as is used in freezers.

Packing Foams

Foams used for packing material and cushioning serve this function because they are elastic and contain entrapped gas bubbles within the structure. Impact loads which potentially can damage a packed product can be modified by the presence of packing foams. The elastic properties permit the foam to flex under load and the entrapped bubbles within are compressed thus absorbing energy. The outer wall of polystyrene, the most commonly used material, exhibits relatively high friction, so foamed materials dissipate impact energy via friction as well. The light weight of the material is useful because its fulfills the packing function without contributing excessive weight and shipping costs.

Buoyancy Foams & Reduced Weight Products

Buoyancy products serve their function because of their density. Such materials are used as floatation materials added to boats, life preservers etc. Survivability of the product also depends upon the materials ability not to adsorb water.

Syntactic Foams—Bubble Additives

Currently, some products add glass, epoxy or phenolic encapsulated bubbles to plastic and fiberglass products. The purposes for doing so include reducing weight and altering electromagnetic and acoustic wave properties while still maintaining structural integrity.

Structural Foams

Rigid foams and structural foams are designed into products at an increasing rate. As the need for light weight products increase, structural foams fill this need. They are utilized in automobiles, airplanes, toys, and low-cost products for the home. The structural applications arise for materials with superior flexural rigidity D to weight ratio per unit area w. Flexural rigidity or stiffness is proportional to the elastic modulus E of the material and the cube of its thickness h, i.e.

$$D \approx E * h^3$$

The weight per unit area A is proportional to the density $\gamma$ and thickness, i.e.

$$w \approx \gamma * h * A / A = \gamma * h$$

Thus the D/w ratio is given as $$D/w \approx E * h^2 / \gamma$$

This ratio indicates that a substantial increase can be achieved by switching from solids to foams. Although the effective elastic modulus of foams is approximately an order of magnitude lower than other structural materials, thickness can be increased considerably and significant reduction in density by two orders of magnitude can effect this ratio to provide a rigid, strong, lightweight material. The honeycomb construction concept, which is reminiscent of foams, has been shown to be quite strong. Thus, it is not surprising that foam cups are more rigid than paper cups although they weigh less.

The syntactic foam material of the present invention comprises two basic elements, 1) the shell defined gas filled bubbles and 2) the bonding agent. Practical implementation also would require a mold to hold the material together in the desired shape until such time that the bonding agent is partially set sufficiently for the material to maintain its integrity whereby it can be removed to continue setting outside the mold.

Encapsulated bubbles can be composed of a wide variety of substances, plastics and non-plastics. Any plastic polymer, including polystyrene, polyurethane, polyamide, silastic, etc and cellulosic plastics like ethyl cellulose, cellulose acetate, cellulose nitrate etc can be fabricated into bubbles and microbubbles. Encapsulated gases can vary as well. Commercial closed-cell foams of most of these are available, but none are considered biodegradable. Encapsulated bubbles produced from biodegradable, natural substances such as pure cellulose, starch, sugars, wheat flour, gelatin, and egg/flour mixture can be used to produce bubbles which can be formed into a closed-cell foam using the present invention. With the exceptions of a few food products like marshmallows and meringue, commercial closed-cell foams of these materials are not available. Of course, such materials are not bonded together to form a syntactic foam as described herein. While open-cell cellulose foams, such as sponges, are common, closed-cell cellulose foam structures cannot be conveniently produced using the available technologies. Such materials in conjunction with the right adhesive can be used to produce a biodegradable and/or an edible foam product. For example, cups and cold drink containers can be made to insulate a chilled substance and still made edible when the user completes the refreshment, much as an ice cream cone.

The bubbles of the syntactic foam of the present invention can be made as follows:

Dynamic Instability Method

One technique to produce microbubbles from a wide variety of materials is a method referred to as dynamic instability. This technique employs flow in a needle/nozzle assembly. This method is a variant of the lawn sprinkler phenomenon. A water jet issues from an orifice and becomes unstable. Waves are propagated along its length and amplify. The outer surface of the jet becomes sinusoidal and the amplitude increases along the length until spherical droplets are formed and released. The event is referred to as a Rayleigh Instability in recognition of work by Rayleigh who first published a practical analysis of the phenomenon in 1886 and now published in a compendium of his work (Rayleigh J W (1945) "The Theory of Sound, Volume II", NY N.Y. Dover Publications: 360-366) The lawn sprinkler is uncontrolled so droplets are non-periodic and nonuniform in size. If however the system is continually stimulated by one frequency in the unstable regime, precision droplets are produced. Hollow or gas filled droplet production is merely an extension of this phenomenon. Chandrasekhar (Chandrasekhar S (1981) "Hydrodynamic and Hydromagnetic Stability" Dover Publications NY N.Y.: 537-541) extended Rayleigh's theory to include hollow jets and found that 1) indeed hollow jets are unstable, 2) hollow jets are somewhat more unstable than continuous jets and 3) the range of unstable frequencies is quite similar. Both of these publications are incorporated herein by reference.

In order to produce hollow jets, an inner hollow needle is placed in the jet stream, either upstream, downstream or at the orifice. If this needle is made to release gas at a constant rate, under certain conditions bubbles can be encapsulated by the surrounding fluid stream when it breaks up into droplets. In order to do this, the liquid jet must be stimulated and coordinated with gas production. Calliger, et al (Calliger R. J., et al "Hollow Drop Production by Injection of Gas Bubbles into a Liquid Jet", Rev Sci Instrum 48 July (1977): 846-851), Foster, et al (Foster C. A., et al Rev Sci Instrum 48 July (1977):6256), Guttman et al (Guttman J. L., et al "An Investigation of the Effects of System Parameters on the Production of Hollow Droplets" J Appl Phy 50 June (1979): 4139-4142) and Tickner, et al (Tickner E. G, et al (Aug. 1981) "Noninvasive Assessment of Pulmonary Hypertension Using Bubble Ultrasonic Ringing Pressure Method" Rasor Assoc. Contractor Final Report HR-62917-1F), all of which are incorporated herein by reference, employed this concept to produce encapsulated bubbles. Foster and Guttman used liquid hydrogen as their liquid. Therefore the gas was hydrogen vapor. Calliger used liquid Freon as a fluid and hydrogen as a gas. In all three cases, encapsulated bubbles could only be accomplished by exposing the droplets to extremely low temperatures for sufficient time to freeze (fuse) the shells. All of these efforts were to develop hydrogen fusion targets. Choice of material was predicated upon a very limited and selective process.

Tickner, et al was the first to encapsulate bubbles at room temperature with a practical method. The objective was to produce pressurized precision microbubbles in a water soluble shell for the purpose of measuring fluid pressure in a remote location. This technical approach, as discussed in U.S. patent (Tickner E. G., (May 1981) "Method of Determining Pressure Within Liquid Containing Vessel" U.S. Pat. No. No. 4,265,251 which is incorporated herein by reference) teaches that the ringing frequency of a bubble is proportional to the local ambient pressure. Tickner, et al employed the Rayleigh Instability using the needle/nozzle assembly to produce precision sized encapsulated microbubbles. The encapsulating fluid was a molten blend of saccharides. The molten droplets cooled during free-fall in an enclosed pressurized tank and this fusion locked the gas bubbles in a hard saccharide capsule and when removed to ambient conditions the bubbles remained pressurized.

The encapsulation approach was shown to work for a variety of organic materials. The requirements were that the material could be liquified without damage. For example, saccharides can caramelize and char at elevated temperatures if held at this temperature for a period of time. This potential problem can be eliminated by controlling the temperature and time the material is exposed to heat. Commercial plastics are perfect for this process because one need not be concerned with degradation of the material while in a fluid state. However, a wide variety of other biodegradable substances like polysaccharides, proteins, waxes, wheat dough and mixtures thereof can be employed too. In some of these cases, it is necessary to heat the chamber wherein the droplets are falling in order to drive off the moisture. A variety of commercial gases can be used in this process.

The needle/nozzle technique is a repeatable methodology. Both laminar flow and surface tension yield a very stable process. Those earlier studies revealed that when the process was started and stabilized, the system would operate literally for hours without even minute changes. Encapsulated bubbles were so accurate that the standard deviation of diameters could not be measured with any technology other than the ringing process. This technical approach lends itself to mass production. However, each material with different physical properties offers its own unique problem which must be solved individually.

Nonprecision Microbubble Production

A second technique of producing microbubbles is by means of the solvent evaporation method. Plastics readily dissolved in a volatile organic solvent which is immiscible in water is compatible with this approach. A polymer is dissolved in a suitable solvent like chloroform, ether, methylene chloride, toluene, etc. This mixture is then added to an aqueous sol like acacia, CMC, PEG, Gelatin, etc, adjusted to a temperature slightly below the solvents boiling point, and dispersed. Then the polymer solvent is allowed to evaporate slowly.

Once the solvent is completely evaporated, the polymer product can be retrieved through filtration. The result is typically a mixture of solid spherical microparticles and hollow microbubbles. With proper choice of polymer solvent, aqueous sol, and dispersation speed, the microbubble yield can be maximized. Microbubble yields up to 90% is achievable. Separation of microbubbles from solid microspheres is easily accomplished by decantation with the solid microbeads precipitating and the microbubbles creaming.

Bonding Systems

To fashion syntactic foam from the microbubbles several adhesion options are available. These options may be classified into three categories. These are:

Cement Adhesion
Reactive Adhesion
Thermoplastic Adhesion

The cement adhesion system employs a solvent based cement whereby the bubbles are mixed with the cement to form a slurry or self supporting moldable mixture. This mixture is then molded into the desired shape and the solvent allowed to evaporate. Any solvent adhesive is suitable so long as it provides adequate adhesion to the microbubble polymer and is a nonsolvent for the polymer. Both aqueous and nonaqueous solvent based adhesives may be used.

The reactive adhesion system requires the addition of heat, catalyst or both to form a substantially infusible and insoluble adhesive. Components are first thoroughly mixed, if this adhesive is a multicomponent system, and the microbubbles are then added to form a slurry. As before the mixture is formed into the desired shape and the adhesive allowed to cure forming a syntactic foam. Unlike the solvent cement adhesive system, very little volume change in the adhesive takes place following curing.

Thermoplastic adhesion utilizes a dry powder adhesive which is activated by heat. With this method the microbubbles are thoroughly dusted with the adhesive powder. The dry mixture is placed in a mold, pressure applied, and the mold heated until the adhesive flows. After cooling, the syntactic foam part is then removed from the mold.

Several alternatives are available for adhering microbubbles together to form useful dispersible structures. The first approach is to choose an adhesive which is or becomes water soluble in the breakdown phase. Upon contact with ground moisture the structure will deteriorate over a selectable time period causing it to break apart and expose additional surface area. The greater surface area will speed the biodegradation of the cellulose microbubbles.

Water soluble polymers suitable for this purpose are well known in the art (see, for example, Chemistry and Technology of Water-Soluble Polymers, Finch, C. A. Editor, 1983, Plenum Press, incorporated herein by reference). Both natural polymers such as starches and casein and synthetic resins such as poly(vinyl alcohol) and poly(vinylpyrrolidone) can be used in this application. Many water soluble resins are good film formers and some, carboxymethylcellulose for example, are based on cellulose. Water soluble cellulose derivatives will generally undergo biodegradation. The hydrophilic nature of the water soluble cellulose molecules assures that hydrophilic microbubbles will be easily wetted by solutions of the water soluble cellulose derivatives. This will meet a basic requirement of an adhesive substance—that it wet the adherents.

Insolubilization of these polymers is often achieved by creating a suitable number of crosslinks in the polymer base of the adhesive. Crosslinks are possible at various sites in the base polymer itself (see chapter "Chemical Modification and Some Crosslinking Reactions of Water Soluble Polymers" in Finch, C. A. cited above). Possible reaction sites include: reactive groups pendant to the polymer backbone, reactive groups which are part of the backbone, and linking between differing reactive polymers. Possible reaction mechanisms include condensation, addition or ionic reaction to yield valence bonding. Still another alternative is the creation of hydrogen bonding between chains.

The possibilities for the creation of crosslinks are generally enhanced in water soluble polymers because all of them contain a significant number of polar groups, often hydroxyls, in sterically exposed positions on the polymer chain. The possible reactions are diverse and are well known to those skilled in the art. Examples include the reaction of poly(vinyl alcohol) with aldehydes which are either monofunctional (e.g., formaldehyde, acetaldehyde) or difunctional (glutaraldehyde, glyoxal, etc.). Starches can react with bifunctional reagents containing methylol groups (e.g., bis-methylolethylene urea) with either methylene or ether linkages. Proteins can be crosslinked by metal ions e.g., the chromium salts used in the tanning of leather.

The ease with which such an insolubilized polymer will break down in the environment is related to both the nature of the crosslinking and to its degree. The covalent bonding described will, of course, be more stable. Hydrogen bonds, with their lower energy, will be more easily broken. Choosing appropriate cross-link density is a central issue for this application and experiment has shown relatively low cross-link densities to be most appropriate.

While the dispersibility in the presence of moisture of the syntactic foam of the invention into bubbles to accelerate biodegradation is an attractive feature, the proposed technology does not preclude the manufacturing of syntactic foam product using adhesives impervious to water exposure as some applications may warrant. However, biodegradation need not be sacrificed. An insoluble yet biodegradable polymer like PHB/PHV can be employed as an adhesive base. Materials such as poly(hydroxyalkanoates) and poly(caprolactones) enhanced biodegradability. Suitable adhesive compositions based on these polymers may be used to adhere the microbubbles into useful structures. Alternatively, photodegradable polymers can serve this function.

The invention will be better understood by reference to the following experimental examples.

EXAMPLE 1

Ethyl Cellulose Microbubbles

Six (6) grams of ethyl cellulose having an ethoxyl content of 48% and a viscosity in 80/20 toluene/alcohol solvent of 22 cP was dissolved in a mixture of 15 ml chloroform and 60 ml ethyl ether. This mixture was slowly poured into a 33° C. aqueous sucrose solution made up of 250 ml $H_2O$ and 33 gm sucrose, and dispersed using a high speed blender (Dispersator @ 220 RPM) Dispersation was continued until the ether/-chloroform solvent was completely evaporated. Dispersation was then halted allowing the microbubbles to rise to the surface. Bubbles were removed and washed five times in 500 ml of DI water. They were then dried in a 60° C. oven overnight. Bubble sizes ranged from 100 to 650 microns in diameter. Mass yield was found to be approximately 80%.

EXAMPLE 2

Cellulose Triacetate Microbubbles

Six (6) gm of cellulose triacetate was dissolved in a mixture of 15 cc chloroform and 65 cc dichloromethane. This mixture was slowly poured into a 36° C. aqueous sol containing 3.5 gm acacia and 20 gm sucrose, and dispersated at 2200 RPM. Dispersation was continued until the solvent had completely evaporated. The mixture was then allowed to stand until the microbubbles creamed. The microbubbles were removed and washed five times in 500 ml of DI water.

EXAMPLE 3

Cellulose Microbubbles

The bubbles formed in the previous example were added to 150 ml of 2% aqueous NaOH solution @ 50° C. and stirred for 90 minutes. This process converted the cellulose triacetate to cellulose by hydrolysis of the ester group. The microbubbles were filtered from the solution, washed thoroughly under running tap water, and then dried in a 60° C. oven overnight. Bubble sizes ranged from 250 to 750 microns in diameter. Mass yield for this step was approximately 90%.

EXAMPLE 4

Polystyrene Microbubbles

Five (5) gm of polystyrene was dissolved in 30 ml of chloroform. This mixture was slowly poured into a 45° C. aqueous sol containing 4.6 gm acacia, 25 gm sucrose, and 250 ml $H_2O$, and dispersated at 2000 RPM. Dispersation was continued until the solvent had evaporated. The mixture was then allowed to stand until the microbubbles creamed. The microbubbles were removed and washed five times in 500 ml of deionized water. They were then dried in an oven overnight at 60° C. Bubble sizes ranged from 125 to 650 microns in diameter. Mass yield was approximately 50%.

EXAMPLE 5

Production of Syntactic Foams

5a) On a weight basis, 1 part hydroxyethyl cellulose was dissolved in 9 parts water. Seven (7) parts ethyl cellulose microbubbles were added and thoroughly blended to form a self supporting moldable mixture. This mixture was formed into a designed configuration and dried in a 60° C. oven overnight. The tholroughly dried and rigid syntactic foam part was then placed in water at room temperature and readily dispersed into its individual component microbubbles.

5b) On a weight basis, 5 parts Elmers Glue-all was mixed with 5 parts water making a diluted glue. Seven (7) parts of Ethyl cellulose microbubbles with an average diameter of approximately 275 microns were added and thoroughly blended together with the diluted adhesive to form a self supporting moldable mixture. This mixture was formed into a designed configuration and dried in a 60° C. oven overnight. The resulting syntactic foam configuration showed no shrinkage cracks resulting from the drying process and was environmentally dispersible.

5c) On a weight basis, 1 part each of a 2 part epoxy resin (Devcon Clear 2 ton Epoxy) were mixed together. To this was added one part ethyl cellulose microbubbles with an average diameter of 275 microns and thoroughly blended to form a self supporting moldable mixture. This mixture was formed into the design configuration and cured at room temperature overnight. The resulting syntactic foam revealed no evidence of shrinkage or cracking. It was not a foam in accordance with the invention as it was not biodispersible due to the use of the epoxy resin as the adhesive. Replacement of the epoxy resin with an appropriate adhesive leads to the formation of a syntactic foam in accordance with the invention.

5d) Seven (7) cc ethyl cellulose bubbles with an average diameter of 275 microns was placed into a cylindrical aluminum mold and pressure applied to compress the bubbles to 5 cc volume. The microbubble containing mold was placed in a 160° C. oven for 35 minutes. The mold was allowed to cool, disassembled, and the formed syntactic foam part removed. This foam, which was made by cohesion of the ethyl cellulose bubbles to one another, was not environmentally dispersible and was thus not in accordance with the invention.

Industrial Applicability

The present invention provides a syntactic foam which can substitute for foams and has significant advantages over foams and over prior art syntactic foams in the areas of biodispersability and biodegradability.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A syntactic foam product having a desired configuration, comprising:
   a plurality of gas filled bubbles arranged in the desired configuration, each of the bubbles being defined by a respective individual and discrete substantially spherical gas-filled shell, each individual shell being in abutting relation with the shells of adjacent bubbles, the shells defining interstices between them where the shells do not abut one another; and
   attaching material attaching the abutting bubbles to one another where they abut one another and being present in an amount such that the interstices between the bubbles are not filled with the attaching material, the attaching material being environmentally degradable at a rate such that it releases the bubbles under ambient conditions after a selected time interval.

2. A syntactic foam product as set forth in claim 1, wherein the environmental degradability of the attaching material is via the attaching material dissolving due to moisture and thereby releasing the bubbles.

3. A syntactic foam product as set forth in claim 1, wherein the shells are formulated of a biodegradable material whereby the released bubbles are in contact with their surroundings and can relatively rapidly biodegrade.

4. A syntactic foam product as set forth in claim 3, wherein the shell material is cellulose, a cellulose derivative, starch, a starch derivative, a dextrin, a sugar, a grain flour, gelatin or a mixture of one or more of such materials.

* * * * *